(12) United States Patent
Hao et al.

(10) Patent No.: US 11,838,338 B2
(45) Date of Patent: Dec. 5, 2023

(54) METHOD AND DEVICE FOR CONFERENCE CONTROL AND CONFERENCE PARTICIPATION, SERVER, TERMINAL, AND STORAGE MEDIUM

(71) Applicant: XI'AN ZHONGXING NEW SOFTWARE CO., LTD., Xi'an (CN)

(72) Inventors: Zhijian Hao, Shenzhen (CN); Yaofeng Tu, Shenzhen (CN); Jingsheng Zhu, Shenzhen (CN); Dan Guan, Shenzhen (CN); Junjun Mei, Shenzhen (CN); Zhidong Zhao, Shenzhen (CN); Jun Chen, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 49 days.

(21) Appl. No.: 17/622,011

(22) PCT Filed: Sep. 7, 2020

(86) PCT No.: PCT/CN2020/113811
§ 371 (c)(1),
(2) Date: Dec. 22, 2021

(87) PCT Pub. No.: WO2021/073313
PCT Pub. Date: Apr. 22, 2021

(65) Prior Publication Data
US 2022/0303319 A1    Sep. 22, 2022

(30) Foreign Application Priority Data

Oct. 16, 2019 (CN) .......................... 201910984798.0

(51) Int. Cl.
*H04L 65/403*        (2022.01)

(52) U.S. Cl.
CPC ................................. *H04L 65/403* (2013.01)

(58) Field of Classification Search
CPC ........ H04N 13/194; H04N 7/15; H04N 7/141; H04N 13/322; H04L 65/403
(Continued)

(56) References Cited

U.S. PATENT DOCUMENTS

| 10,529,111 B1 * | 1/2020 | Wu ..................... G06V 40/174 |
| 2012/0140019 A1 | 6/2012 | Jung et al. |

(Continued)

FOREIGN PATENT DOCUMENTS

| CN | 102413184 A * | 4/2012 |
| CN | 103634563 A | 3/2014 |

(Continued)

OTHER PUBLICATIONS

International Searching Authority. International Search Report and Written Opinion for PCT Application No. PCT/CN2020/113811 and English translation, dated Oct. 28, 2020, pp. 1-9.
(Continued)

*Primary Examiner* — Melur Ramakrishnaiah
(74) *Attorney, Agent, or Firm* — Vivacqua Crane, PLLC (57) ABSTRACT

A method and device for conference control and conference participation, server, terminal, and storage medium are disclosed. The conference control method may include: acquiring conference bitstream of a current conference; performing, in response to extracting three-dimensional resource identification information from the conference bitstream, a three-dimensional resource matching in a preset three-dimensional resource repository based on the three-dimensional resource identification information; and transmitting, in response to matching a target three-dimensional resource corresponding to the three-dimensional resource identification information in the three-dimensional resource reposi- (Continued)

tory, the target three-dimensional resource to a three-dimensional resource processing terminal of a conference participating terminal.

17 Claims, 6 Drawing Sheets

(58) Field of Classification Search
USPC .......................................... 348/14.01–14.16
See application file for complete search history.

(56) References Cited

U.S. PATENT DOCUMENTS

| | | |
|---|---|---|
| 2012/0206561 A1 | 8/2012 | Huang |
| 2016/0353056 A1* | 12/2016 | Cullen ..................... G06T 7/70 |
| 2017/0104793 A1* | 4/2017 | Farrell ................. G06V 40/166 |
| 2019/0215482 A1* | 7/2019 | Sathya ..................... H04N 7/15 |

FOREIGN PATENT DOCUMENTS

| | | | | |
|---|---|---|---|---|
| CN | 104639777 A | | 5/2015 | |
| CN | 105791390 A | | 7/2016 | |
| CN | 105933637 A | * | 9/2016 | ........... H04N 13/332 |
| CN | 105933637 A | | 9/2016 | |
| CN | 110012257 A | | 7/2019 | |
| CN | 110022329 A | * | 7/2019 | ............. H04L 67/06 |
| CN | 110022329 A | | 7/2019 | |

OTHER PUBLICATIONS

The State Intellectual Property Office of People's Republic of China. First Office Action for CN Application No. 2019109847980 and English translation, dated Mar. 14, 2023, pp. 1-17.
The State Intellectual Property Office of People's Republic of China. Search Report for CN Application No. 2019109847980 and English translation, dated Mar. 13, 2023, pp. 1-4.

* cited by examiner

METHOD AND DEVICE FOR CONFERENCE CONTROL AND CONFERENCE PARTICIPATION, SERVER, TERMINAL, AND STORAGE MEDIUM

CROSS-REFERENCE TO RELATED APPLICATION

This application is a national stage filing under 35 U.S.C. § 371 of international application number PCT/CN2020/113811, filed on Sep. 7, 2020, which claims priority of the Chinese patent application No. 201910984798.0 filed on Oct. 16, 2019. The entire contents of these applications are incorporated herein by reference.

TECHNICAL FIELD

Embodiments of the present disclosure relate to the field of communication technologies, and in particular, to a method and device for conference control and conference participating, a server, a terminal, and a storage medium.

BACKGROUND

In order to meet requirements of off-site conferences, teleconferencing and videoconferencing technologies supporting remote conferences have been widely used. In particular, in the video conferencing technology, two or more participants in different locations (that is, users participating in videoconferencing) hold a video conference through a camera device, a communication device, a video playback device and a network, which is similar to a face-to-face conversation. A videoconferencing system has been widely used in enterprises, public institutions and government agencies to realize video calls between multiple points by using a local device and a terminal device. However, in some cases, participants in videoconferencing can only view a corresponding two-dimensional video picture on a screen of a conference terminal. As a result, the conference has a single display effect, which is not conducive to improving user experience satisfaction.

SUMMARY

According to some embodiments of the present disclosure, a method and device for conference control and conference participating, a server, a terminal, and a storage medium are provided, to at least solve one of the related technical problems to some extent, including the single display effect of video conferencing, which is not conducive to improving user experience satisfaction.

In view of the above, according to some embodiments of the present disclosure, a conference control method is provided, including steps of: acquiring conference bitstream of a current conference; performing, in response to extracting three-dimensional resource identification information from the conference bitstream, a three-dimensional resource matching in a three-dimensional resource repository based on the three-dimensional resource identification information; and transmitting, in response to matching a target three-dimensional resource corresponding to the three-dimensional resource identification information in the three-dimensional resource repository, the target three-dimensional resource to a three-dimensional resource processing terminal of a conference participating terminal.

In view of the above, according to some embodiments of the present disclosure, a method for participating conference is further provided, including steps of: receiving a target three-dimensional resource transmitted by a conference server, the target three-dimensional resource being a three-dimensional resource matched by the conference server in a preset three-dimensional resource repository based on three-dimensional resource identification information extracted from current conference bitstream; and presenting the target three-dimensional resource.

In view of the above, according to some embodiments of the present disclosure, a conference control device is further provided, including: a bitstream acquisition module configured for acquiring conference bitstream of a current conference; and a control module configured for performing, in response to extracting three-dimensional resource identification information from the conference bitstream, a three-dimensional resource matching in a three-dimensional resource repository based on the three-dimensional resource identification information, and transmitting, in response to matching a target three-dimensional resource corresponding to the three-dimensional resource identification information in the three-dimensional resource repository, the target three-dimensional resource to a three-dimensional resource processing terminal of a conference participating terminal.

In view of the above, according to some embodiments of the present disclosure, a conference participating device is further provided, including: a resource receiving module configured for receiving a target three-dimensional resource transmitted by a conference server, the target three-dimensional resource being a three-dimensional resource matched by the conference server in a preset three-dimensional resource repository based on three-dimensional resource identification information extracted from current conference bitstream; and a resource presenting module configured for presenting the target three-dimensional resource.

In view of the above, according to some embodiments of the present disclosure, a conference server is further provided, including a first processor, a first memory and a first communication bus. The first communication bus is configured for connecting the first processor and the first memory. The first processor is configured for executing a first computer program stored in the first memory, to perform steps of the conference control method described above.

In view of the above, according to some embodiments of the present disclosure, a conference participating terminal is further provided, including a second processor, a second memory and a second communication bus. The second communication bus is configured for connecting the second processor and the second memory. The second processor is configured for executing a second computer program stored in the second memory, to perform steps of the method for conference participating described above.

In view of the above, according to some embodiments of the present disclosure, a computer-readable storage medium is further provided, storing a first computer program which, when executed by a first processor, causes the first processor to perform steps of the conference control method described above. Alternatively, the computer-readable storage medium storing a second computer program which, when executed by a second processor, causes the second processor to perform steps of the method for participating conference described above.

Other features and corresponding beneficial effects of the present disclosure will be set forth in part in the description which follows, and it should be understood that at least part of the beneficial effects will become apparent from the disclosure in the description of the present disclosure.

DETAILED DESCRIPTION

In order to make objects, technical schemes and advantages of the present disclosure clearer, the embodiments of the present disclosure are described in further detail below by specific embodiments in conjunction with the drawings. It should be understood that specific embodiments described herein are intended only to interpret and not to limit the present disclosure.

Embodiment One

According to this embodiment, a conference control method is provided. The conference control method may involve presetting, on a server side, a three-dimensional resource repository for storing and maintaining three-dimensional resources. The three-dimensional resources stored in the three-dimensional resource repository may be called as required. Moreover, in some examples of this embodiment, the three-dimensional resources in the three-dimensional resource repository may be dynamic updated. The three-dimensional resources in the three-dimensional resource repository may be flexibly set as required. The three-dimensional resources in this embodiment may include, but is not limited to, various three-dimensional model resources.

In this embodiment, on a conference server side, conference bitstream of a current conference may be acquired. When three-dimensional resource identification information is extracted from the conference bitstream, a three-dimensional resource matching is performed in a three-dimensional resource repository based on the three-dimensional resource identification information, and a matched target three-dimensional resource is transmitted to a three-dimensional resource processing terminal of a conference participating terminal. The three-dimensional resource processing terminal of the conference participating terminal, upon receiving the target three-dimensional resource, presents the received target three-dimensional resource, which realizes dynamic matching, calling and display of the three-dimensional resource during the conference. Compared with the schemes that only two-dimensional pictures can be displayed in some cases, the conference control method according to this embodiment provides an enriched conference display effect, can improve user experience satisfaction to a large extent and further expand scenarios applicable to the conference, and has wide application scenarios, great practical value and large market space.

Figure 1:
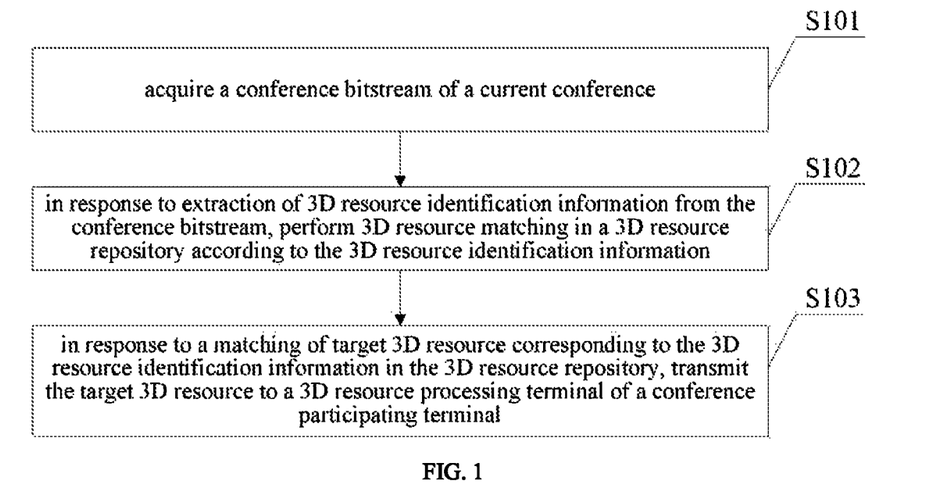
FIG. 1 is a schematic flowchart of a conference control method according to Embodiment one of the present disclosure.

Referring to FIG. 1, the conference control method according to this embodiment includes the following steps.

At step S101, conference bitstream of a current conference is acquired.

It should be understood that the conference in this embodiment may be a point-to-point conference, a point-to-multipoint conference, or a multipoint-to-multipoint conference. Moreover, the conference in this embodiment may include, but is not limited to, various work conferences, training conferences and educational conferences.

In this embodiment, the conference bitstream includes audio bitstream, and may further include video bitstream according to a requirement of a specific application scenario. For example, in some application scenarios, the conference bitstream may include audio bitstream and main video bitstream. In some other application scenarios, the conference bitstream may include audio bitstream, main video bitstream, and auxiliary video bitstream. Content contained in the conference bitstream may be flexibly determined according to specific application scenarios.

It should be understood that the conference bitstream in this embodiment includes conference bitstream currently transmitted by conference participating terminals (that is, all parties participating in the conference). Moreover, in this embodiment, S101 may be performed by a conference server.

At step S102, when three-dimensional resource identification information is extracted from the conference bitstream, a three-dimensional resource matching is performed in a three-dimensional resource repository based on the three-dimensional resource identification information.

In this embodiment, for the conference bitstream acquired in S101, it may be monitored whether there is three-dimensional resource identification information in the conference bitstream. The three-dimensional resource identification information in this embodiment may include any information that uniquely identifies a three-dimensional resource. For example, in some application scenarios, the three-dimensional resource identification information may include, but is not limited to, at least one of a variety of text information (including at least one of Chinese characters, symbols, numbers, English, etc.), acoustic code information and picture information.

In this embodiment, the three-dimensional resource identification information may be carried in the conference bitstream. In this way, the three-dimensional resource identification information can be flexibly transmitted to the conference server side along with the conference bitstream without changing a conference control process or adding special steps, which has advantages of good versatility, easy implementation and low cost. In addition, it should be understood that, in this embodiment, the manner of carrying the three-dimensional resource identification information in the conference bitstream can be flexibly set.

For example, when the three-dimensional resource identification information includes the text information in an example, the conference participating terminals may input corresponding text information in various manners, and the inputted text information is carried in the conference bitstream to be transmitted to the server side. When the three-dimensional resource identification information includes acoustic code information, a user of the conference participating terminal may make a voice, or play an audio file or a video file having the acoustic code information, to implement a three-dimensional resource identification information carried in the conference bitstream. When the three-dimensional resource identification information includes picture information, the user of the conference participating terminal may display a corresponding picture, a video file, a document having the picture information, or the like, to implement a three-dimensional resource identification information carried in the conference bitstream.

For example, in an application scenario, in case that the conference bitstream includes main video bitstream, auxiliary video bitstream, and audio bitstream, when the three-dimensional resource identification information includes at least one of the text information and the picture information, the step of extracting the three-dimensional resource identification information from the conference bitstream may include, but is not limited to, extracting the three-dimensional resource identification information from at least one of the main video bitstream, the auxiliary video bitstream and the audio bitstream.

Meanwhile, when the three-dimensional resource identification information includes acoustic code information, the step of extracting the three-dimensional resource identification information from the conference bitstream includes: extracting the three-dimensional resource identification information from the audio bitstream.

At step S103, when a target three-dimensional resource corresponding to the three-dimensional resource identification information is matched in the three-dimensional resource repository, the target three-dimensional resource is transmitted to a three-dimensional resource processing terminal of a conference participating terminal.

In this embodiment, a terminal on the conference participating terminal side may include a three-dimensional resource processing terminal for displaying three-dimensional resources, which, for example, may include, but is not limited to, an Augmented Reality (AR) terminal. When a target three-dimensional resource is matched during execution of S103, the conference server delivers the matched target three-dimensional resource to the three-dimensional resource processing terminal of each conference participating terminal, to enable each three-dimensional resource processing terminal to present the three-dimensional resource, so that participants can see a more realistic three-dimensional display effect, which improves the richness of content of the conference and the display effect.

For example, in an application scenario, when there is a three-dimensional resource processing management terminal in a site of the conference, the conference server may transmit the target three-dimensional resource to the three-dimensional resource processing management terminal, and deliver the target three-dimensional resource to a three-dimensional resource processing terminal of each conference participating terminal in the site by means of the three-dimensional resource processing management terminal. In some examples, when the three-dimensional resource processing management terminal transmits the target three-dimensional resource to the three-dimensional resource processing terminal of respective conference participating terminals, the three-dimensional resource processing terminal of the respective conference participating terminals may be instructed to display the three-dimensional resource at an indicated position in an indicated unified coordinate system (in this case, participants see the same three-dimensional resources), or the three-dimensional resource processing terminal of the respective conference participating terminals may be instructed to display the three-dimensional resource at a corresponding position in its own coordinate system (in this case, the participants see the three-dimensional resource displayed by their own three-dimensional resource processing terminals in their own coordinate systems).

In this embodiment, the conference control method further includes the following steps.

The conference server may further transmit the received conference bitstream to a video terminal of the conference participating terminal, enabling audio conferencing and video conferencing at the same time. It should be understood that, in some examples, the three-dimensional resource processing terminal and the video terminal may be two independent physical terminals, or one physical terminal.

Figure 2:
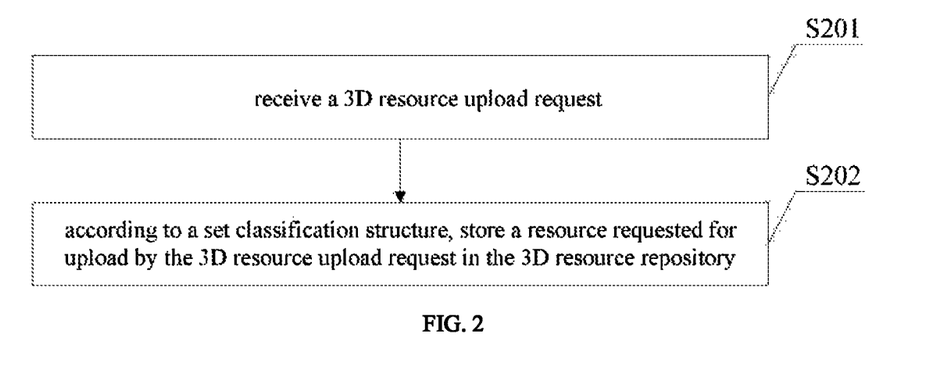
FIG. 2 is a schematic flowchart of a process of uploading a three-dimensional resource according to Embodiment one of the present disclosure.

In some examples of this embodiment, a process of uploading the three-dimensional resource to the conference server may also be included, which, referring to FIG. 2, includes the following steps.

At step S201, a three-dimensional resource upload request is received.

In this embodiment, the conference server receives the three-dimensional resource upload request. In some application examples, the conference server may provide a corresponding upload management interface, to allow a user to upload a three-dimensional resource on the upload management interface.

At step S202, a resource requested for upload by the three-dimensional resource upload request is stored in the three-dimensional resource repository according to a preset classification structure.

In this embodiment, the three-dimensional resource uploaded by the user may be stored by classification or randomly.

In some examples of this embodiment, in order to improve security management, security verification may be performed on the three-dimensional resource uploaded by the user, and the three-dimensional resource is allowed to be stored after the verification succeeds. Alternatively, permission verification may be performed on the user uploading the three-dimensional resource, and the user is allowed to upload the three-dimensional resource when the user has a corresponding permission.

Figure 3:
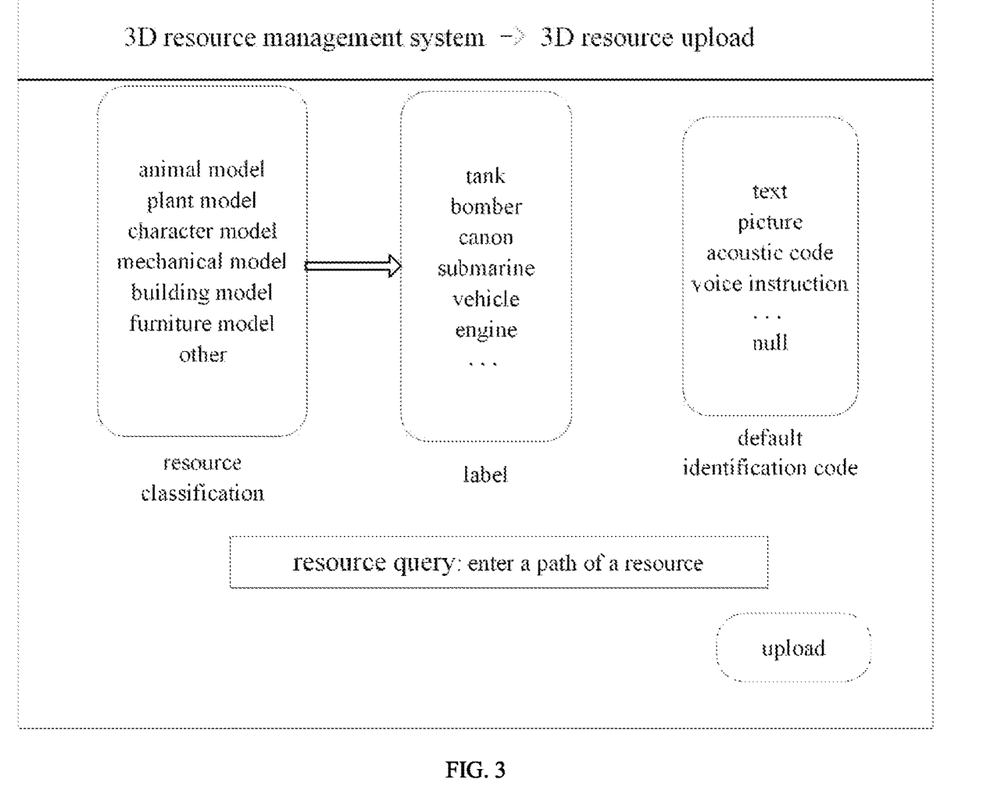
FIG. 3 is a schematic diagram of a resource upload interface according to Embodiment one of the present disclosure.

For example, an resource upload interface is as shown in FIG. 3, which includes resource classification, labels, and default identification information of three-dimensional resources. When uploading three-dimensional resources, the user may determine a category to which a to-be-uploaded three-dimensional resource belongs (such as a mechanical model), a label under the category (such as vehicle) and default identification information of the to-be-uploaded three-dimensional resource (which may be set or not, such as null). After making a determination, the user may click an upload button to upload the three-dimensional resource to a corresponding position in the corresponding three-dimensional resource repository. In some examples of this embodiment, the conference server may also provide a three-dimensional resource query entry for the user to query for three-dimensional resources. For example, an three-dimensional resource query entry is as shown in FIG. 3.

Figure 4:
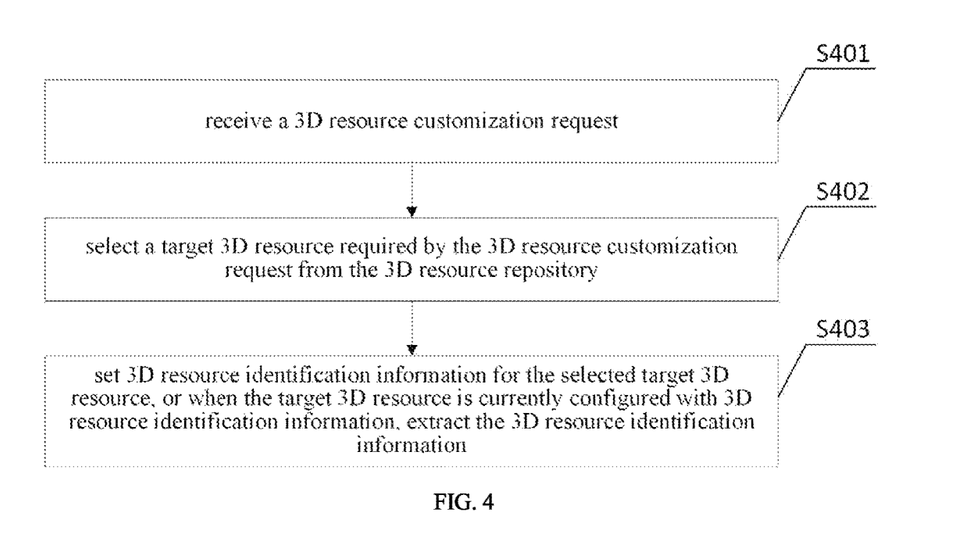
FIG. 4 is a schematic flowchart of a process of customizing a three-dimensional resource according to Embodiment one of the present disclosure.

In some examples of this embodiment, prior to S101 of acquiring conference bitstream of a current conference, a following three-dimensional resource customization process shown in FIG. 4 performed on the conference may also be included, including the following steps.

At step S401, a three-dimensional resource customization request is received.

In this embodiment, the three-dimensional resource customization request received on the conference server side may include indication information of a to-be-customized three-dimensional resource. For example, the user may find the to-be-customized three-dimensional resource through a three-dimensional resource query interface provided by the interface shown in FIG. 4, and then click "Select" to deliver the three-dimensional resource customization request to the conference server.

In some examples of this embodiment, when a three-dimensional resource to be customized currently does not exist in the three-dimensional resource repository, the corresponding three-dimensional resource may be called from another terminal or resource repository.

At step S402, a target three-dimensional resource required by the three-dimensional resource customization request is selected from the three-dimensional resource repository.

At step S403, three-dimensional resource identification information is set for the selected target three-dimensional resource (it should be understood that, in this embodiment, regardless of whether the three-dimensional resource identification information is currently set for the target three-dimensional resource, corresponding three-dimensional resource identification information may be set for the target three-dimensional resource; and therefore, in this embodiment, one piece of three-dimensional resource identification information or two or more pieces of three-dimensional resource identification information may be set for one three-dimensional resource), or when the target three-dimensional resource is currently configured with three-dimensional resource identification information, the three-dimensional resource identification information is directly extracted. The three-dimensional resource identification information set or extracted may to be carried in the conference bitstream during the subsequent conference.

Figure 5:
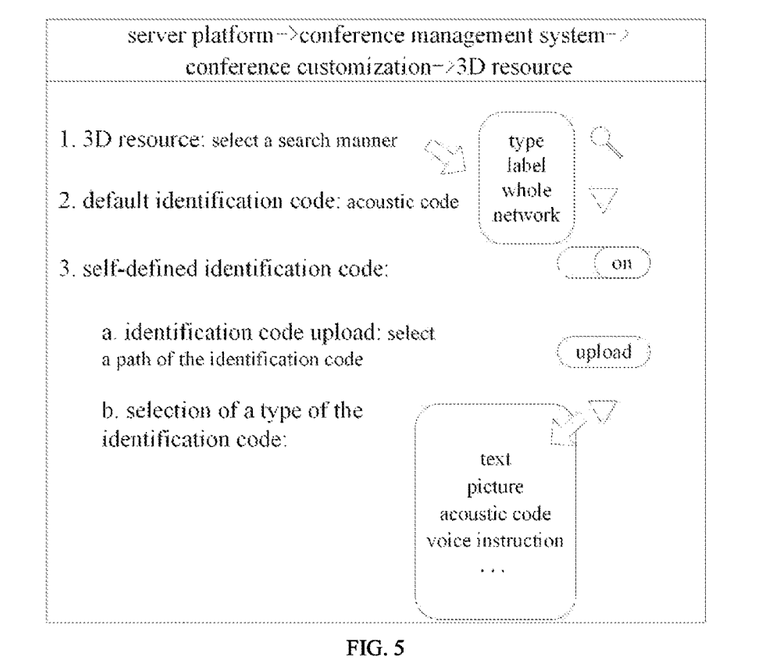
FIG. 5 is a schematic flowchart of a conference customization interface according to Embodiment one of the present disclosure.

For example, a conference customization interface is shown in FIG. 5. The user selects a three-dimensional resource search manner, and selects a default identification code or a user-defined identification code of the three-dimensional resource as the three-dimensional resource identification information, and may select a corresponding identification code type, such as text, pictures and acoustic code (including, but not limited to, voice instructions), etc.

In an example of this embodiment, after the step of transmitting the target three-dimensional resource to a three-dimensional resource processing terminal of a conference participating terminal, the method may further include the following steps.

When a three-dimensional resource synchronization request transmitted by the conference participating terminal of the conference is received, a three-dimensional resource requested for synchronization is transmitted by the three-dimensional resource synchronization request to a three-dimensional resource processing terminal of at least one conference participating terminal of the conference.

In some examples of this embodiment, the target three-dimensional resource is transmitted to the three-dimensional resource processing terminal of the conference participating terminal. The three-dimensional resource processing terminal may be supported or allowed to present the received target three-dimensional resource, and may also be supported to edit the target three-dimensional resource. The editing may include, but is not limited to, at least one of zoom in, zoom out, add content, delete content, change a background color, change a display position, and the like.

In some application examples of this embodiment, the three-dimensional resource requested for synchronization by the three-dimensional resource synchronization request may include the target three-dimensional resource processed by the three-dimensional resource processing terminal, or a new three-dimensional resource to be shared by the three-dimensional resource processing terminal.

In this embodiment, when receiving a three-dimensional resource synchronization request transmitted by the conference participating terminal of the conference, the conference server may transmit a three-dimensional resource requested for synchronization by the three-dimensional resource synchronization request to three-dimensional resource processing terminals of all conference participating terminals of the conference, or transmit the three-dimensional resource to a three-dimensional resource processing terminal specified by the three-dimensional resource synchronization request.

In some examples of this embodiment, the three-dimensional resource processing terminal is allowed to initiate synchronization of the three-dimensional resource in certain conference modes (such as a moderator mode), while in other conference modes (such as a site mode), the three-dimensional resource processing terminal is not allowed to initiate synchronization of the three-dimensional resource.

In some examples of this embodiment, conference participating terminals with a preset permission are allowed to synchronize the three-dimensional resource. In this case, referring to FIG. 6, in this example, prior to the step of transmitting a three-dimensional resource requested for synchronization by the three-dimensional resource synchronization request to a three-dimensional resource processing terminal of at least one conference participating terminal of the conference, the method may further include the following steps.

Figure 6:
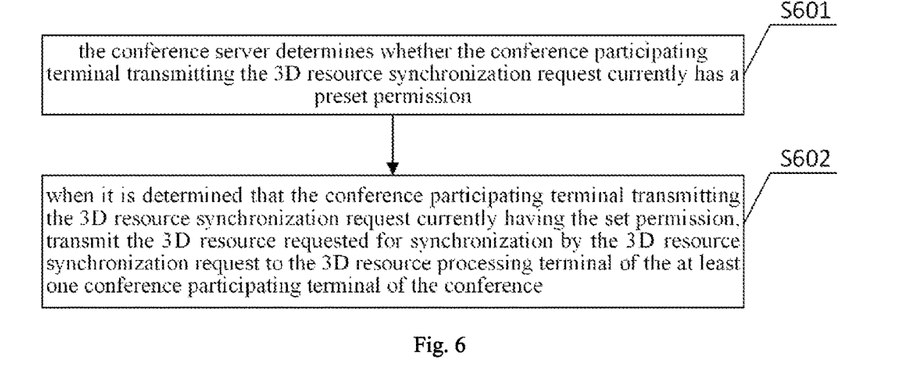
FIG. 6 is a schematic flowchart of three-dimensional resource synchronization according to Embodiment one of the present disclosure.

At step S601, the conference server determines whether the conference participating terminal transmitting the three-dimensional resource synchronization request currently has a preset permission (such as a moderator permission).

At step S602, when it is determined that the conference participating terminal transmitting the three-dimensional resource synchronization request currently has the preset permission, the three-dimensional resource requested for synchronization by the three-dimensional resource synchronization request is transmitted to the three-dimensional resource processing terminal of the at least one conference participating terminal of the conference.

Figure 7:
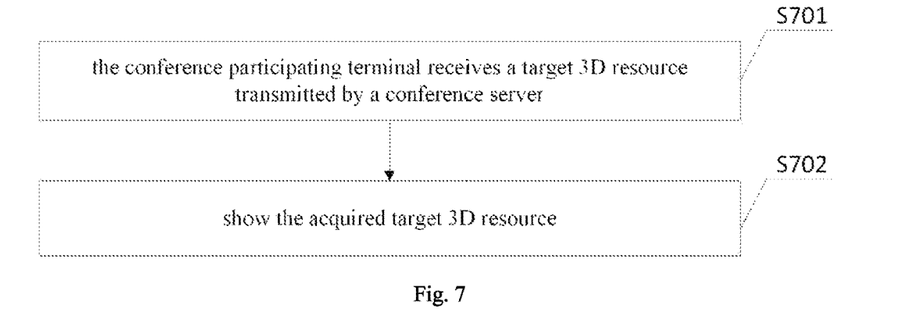
FIG. 7 is a schematic flowchart of a method for participating conference according to Embodiment one of the present disclosure.

This embodiment further provides a method for participating conference for a conference participating terminal, which, referring to FIG. 7, includes the following steps.

At step S701, the conference participating terminal receives a target three-dimensional resource transmitted by a conference server.

The target three-dimensional resource is a three-dimensional resource matched by the conference server in a preset three-dimensional resource repository based on three-dimensional resource identification information extracted from current conference bitstream. The matching process may be referred to, but not limited to, the above example process.

At step S702, the acquired target three-dimensional resource is presented, for example, displayed.

In some examples of this embodiment, the three-dimensional resource processing terminal of the conference participating terminal may present the target three-dimensional resource in, but not limited to, any one of the following manners.

In a first manner, the three-dimensional resource is displayed at an indicated position in an indicated unified coordinate system.

In a second manner, the three-dimensional resource is displayed at a corresponding position in its own coordinate system.

Figure 8:
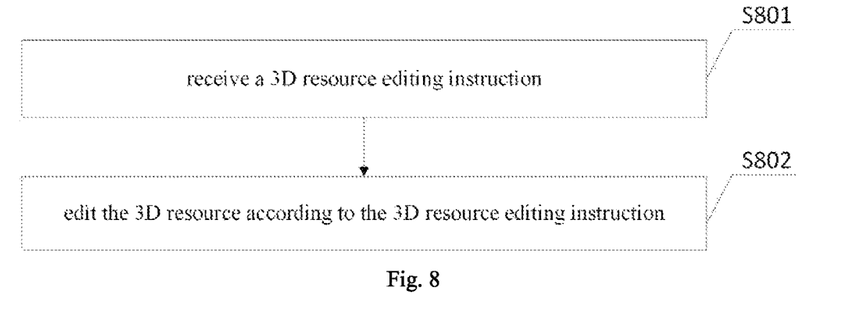
FIG. 8 is a schematic flowchart of three-dimensional resource editing according to Embodiment one of the present disclosure.

In some examples of this embodiment, referring to FIG. 8, the method for participating conference may further include the following three-dimensional resource editing process.

At step S801, a three-dimensional resource editing instruction is received.

The three-dimensional resource processing terminal of the conference participating terminal may receive a three-dimensional resource editing instruction transmitted by a user. The three-dimensional resource editing instruction may be at least one of zoom in, zoom out, add content, delete content, change a background color, change a display position, and the like.

At step S802, the three-dimensional resource is edited according to the three-dimensional resource editing instruction.

Figure 9:
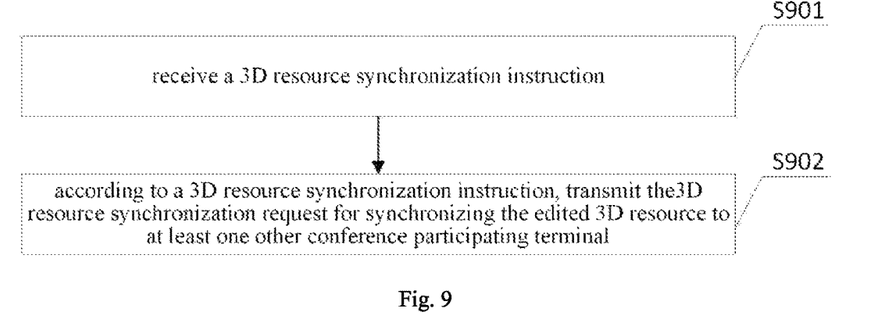
FIG. 9 is a schematic flowchart of initiation of three-dimensional resource synchronization according to Embodiment one of the present disclosure.

In some examples of this embodiment, referring to FIG. 9, the method for participating conference may further include the following three-dimensional resource synchronization process.

At step S901, a three-dimensional resource synchronization instruction is received.

The three-dimensional resource processing terminal of the conference participating terminal may receive a three-dimensional resource editing instruction transmitted by the user.

At step S902, a three-dimensional resource synchronization request for synchronizing the edited three-dimensional resource to at least one other conference participating terminal is transmitted to the conference server according to the three-dimensional resource synchronization instruction. A three-dimensional resource synchronization request for requesting a new to-be-shared three-dimensional resource may also be transmitted to the conference server.

For ease of understanding, the conference control method according to this embodiment is summarized in this embodiment as follows based on specific application scenarios.

The conference control method according to this embodiment may be applied to a conference server integrating a video terminal and a three-dimensional resource processing terminal. The conference server may be configured for storing, managing and scheduling three-dimensional resources. Moreover, three-dimensional resource identification information may be matched for each three-dimensional resource in this embodiment. After a conference starts, the conference server may monitor auxiliary stream content (or main stream content, etc.) in real time. When detecting three-dimensional resource identification information (such as acoustic codes, pictures, and text), the conference server may acquire and distribute three-dimensional resources to conference participating terminals in each branch site. The method according to this embodiment further includes a policy for pushing three-dimensional resources and placing three-dimensional resources, as well as interactive modes for each site to operate the three-dimensional resources. In the era of big data, the conference control method according to this embodiment may also be applied to teaching in schools or training institutions, as well as companies' conference, publicity or product exhibition sites, and it has wide application scenarios, great practical value and large market space.

In this embodiment, for the three-dimensional resource processing terminal of the conference participating terminal (taking an AR terminal as an example), the conference server may identify and transmit a three-dimensional resource (such as an enhanced model) to the AR terminal according to an auxiliary stream (or a main stream), and may render the model and transmit model data on the conference server side. For the video terminal of the conference participating terminal, the conference participating terminal may still transmit audio and main and auxiliary bitstream normally, with no original functions affected. At the same time, a system for model management is provided to facilitate upload and use of a model.

In this embodiment, the three-dimensional resource may be matched by identifying content of the conference bitstream instead of identifying a physical object by a camera. It has high identification efficiency. Existing content (such as text, pictures and sound) in the original conference bitstream may be used as the three-dimensional resource identification information, so that the three-dimensional resource may be matched and displayed without changing an original file. This breaks a currently common practice of matching a three-dimensional model by collecting a physical object through a camera in AR applications. In the era of big data, electronic data is still more popular, so an augmented reality technology for digital identification will have greater market value.

In some examples of this embodiment, an AR terminal playing a role of "management" (that is, an AR management terminal) is set for each site. The AR management terminal has a permission to adjust a display position of the three-dimensional resource in the site. The conference server may transmit the three-dimensional resource to each AR device participating the conference through the AR management terminal of each site.

1. Display at unified position: the AR management terminal instructs all AR devices in the site to uniformly use a coordinate system of a specified target as a unified coordinate system, and place the three-dimensional resource at a specified position in the coordinate system. The participants see the same three-dimensional model.

2. Display at individual position: the AR management terminal instructs all AR devices in the site to use their respective coordinate systems for reference. The three-dimensional resource is displayed in front of the AR devices, and the participants are enabled to see their own three-dimensional models.

In some examples of this embodiment, in addition to an AR device playing a role of "management" provided in each site, at least one AR device playing a role of "moderator" may also be provided during the entire conference. The AR device playing a role of "moderator" may also have the permission of the role of "management".

1. Moderator mode: operations performed by a participant wearing the AR device with a role of "moderator" on a three-dimensional resource may be transmitted in real time to the conference server. Then, the conference server may synchronize a change in a state of the three-dimensional resource to AR devices of other participants in each site. In the moderator mode, it may be set that the other participants in each site have no permission to operate the three-dimensional resource. Certainly, in some examples, it may be set that each site has a permission to shield a model state synchronized by a system i.e. in a conference mode.

2. Conference mode: participants in each site may operate a three-dimensional model (the model may be displayed at a unified position or individually displayed in each AR device). In this mode, the operation on the three-dimensional model is not uploaded to the conference server, and thus may not be synchronized to other sites.

If a state of the three-dimensional model (including a size, a rotation angle, zooming, and other attributes) is to be synchronized to other participants in the conference mode, the role of "moderator" may be applied. The AR device having the permission of "moderator" is allowed to upload a state of the three-dimensional model to the conference server which then synchronizes the state of the three-dimensional model to the other participants.

In some examples, an AR device in the main site plays a role of "moderator" by default, and an AR device that does not play a role of "moderator" may apply to an AR device that currently plays a role of "moderator" for the role of "moderator". After the AR device that currently plays a role of "moderator" agrees, the AR device becomes anew "moderator", and the original AR device that plays a role of "moderator" no longer has the permission of "moderator".

Embodiment Two

This embodiment provides a conference control device. The conference control device may be applied to a conference server, which, referring to FIG. 10, includes following modules.

Figure 10:
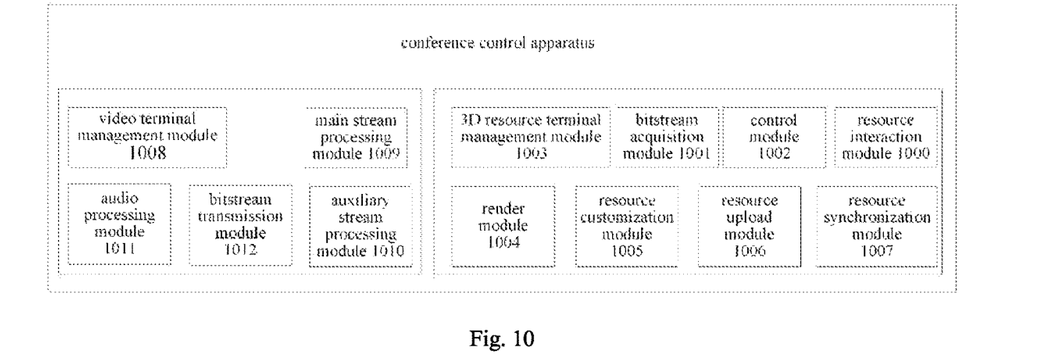
FIG. 10 is a schematic structural diagram of a conference control device according to Embodiment two of the present disclosure.

A bitstream acquisition module 1001 is configured to acquire conference bitstream of a current conference. Reference may be made to the above embodiment for an acquisition process, which will not be described in detail herein again.

A control module 1002 is configured to, when three-dimensional resource identification information is extracted from the conference bitstream, perform a three-dimensional resource matching in a three-dimensional resource repository based on the three-dimensional resource identification information, and when a target three-dimensional resource corresponding to the three-dimensional resource identification information is matched in the three-dimensional resource repository, transmit the target three-dimensional resource to a three-dimensional resource processing terminal of a conference participating terminal. Reference may be made to the above embodiment for a matching control process, which will not be described in detail herein again.

Referring to FIG. 10, the conference control device may further include following modules.

A three-dimensional resource terminal management module 1003 is configured to access a three-dimensional resource terminal, manage a role of the three-dimensional resource terminal, synchronize a three-dimensional resource state of the three-dimensional resource terminal, and the like.

A resource upload module 1006 is configured to support placing made three-dimensional resources on a conference server platform, and selecting a corresponding three-dimensional resource during three-dimensional resource customization. Reference may be made to the above embodiment for upload and query processes, which will not be described in detail herein again.

A resource customization module 1005 is configured to select a three-dimensional resource to be used when reserving a conference. Reference may be made to the above embodiment for a customization process, which will not be described in detail herein again.

A render module 1004 is configured to render the three-dimensional resource on a conference server terminal.

A resource synchronization module 1007 is configured to synchronize the three-dimensional resource to a three-dimensional resource processing terminal of at least one conference participating terminal of the conference as required. Reference may be made to the above embodiment for a synchronization, which will not be described in detail herein again.

A resource interaction module 1000 is configured to perform resource interaction, such as rotation, zooming and editing interaction, with the three-dimensional resource processing terminal. Certainly, such editing operations may also be locally processed on the three-dimensional resource processing terminal.

Referring to FIG. 10, the conference control device may further include a function module on a videoconferencing system, which may include, but is not limited to, following modules.

A video terminal management module 1008 is configured to access a traditional video terminal. A main stream processing module 1009 is configured to process, such as decode, encode, and synthesize, main video bitstream.

An auxiliary stream processing module 1010 is configured to process an auxiliary bitstream and forward the auxiliary bitstream to other terminals.

An audio processing module 1011 is configured to process, such as decode, mix and encode, audio bitstream.

A bitstream transmission module 1012 is configured to transmit and receive the audio, main and auxiliary video bitstream.

Figure 11:
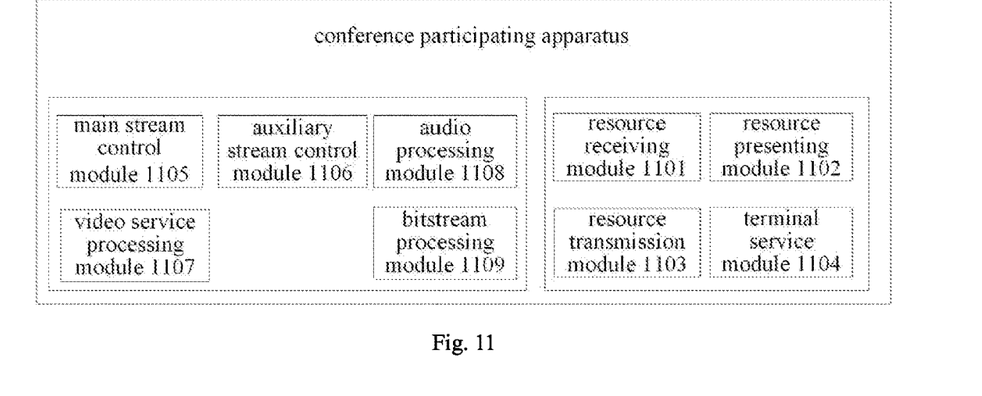
FIG. 11 is a schematic structural diagram of a conference participating device according to Embodiment two of the present disclosure.

This embodiment further provides a conference participating device. The conference participating device may be applied to various conference terminals, including a three-dimensional resource processing terminal. Referring to FIG. 11, it includes following modules.

A resource receiving module 1101 is configured to receive a target three-dimensional resource transmitted by a conference server. The target three-dimensional resource is a three-dimensional resource matched by the conference server in a preset three-dimensional resource repository based on three-dimensional resource identification information extracted from current conference bitstream. Reference may be made to the above embodiment for a receiving process, which will not be described in detail herein again.

A resource presenting module 1102 is configured to present the target three-dimensional resource. Reference may be made to the above embodiment for a showing process, which will not be described in detail herein again.

A resource transmission module 1103 is configured to transmit and receive data of the three-dimensional resource.

A terminal service module 1104 is configured to manage and control the three-dimensional resource terminal.

Referring to FIG. 11, the conference participating device may further include, but is not limited to, following modules.

A main stream control module 1105 is configured to process main video bitstream, receive and decode the bitstream, and then display the bitstream on the screen; and collect and encode main video, and then transmit it to a bitstream transmission module;

An auxiliary stream control module 1106 is configured to process auxiliary video bitstream, receive and decode auxiliary video, and then display the auxiliary video on the screen; and collect and encode auxiliary video, and then transmit it to the bitstream transmission module;

An audio processing module 1108 is configured to process audio bitstream, receive and decode audio, and then output the audio to a speaker; and collect and encode sound, and then transmit it to the bitstream transmission module;

A bitstream transmission module 1107 is configured to transmit and receive the audio, main and auxiliary video bitstream.

A terminal service module 1109 is configured to manage and control a video terminal.

Figure 12:
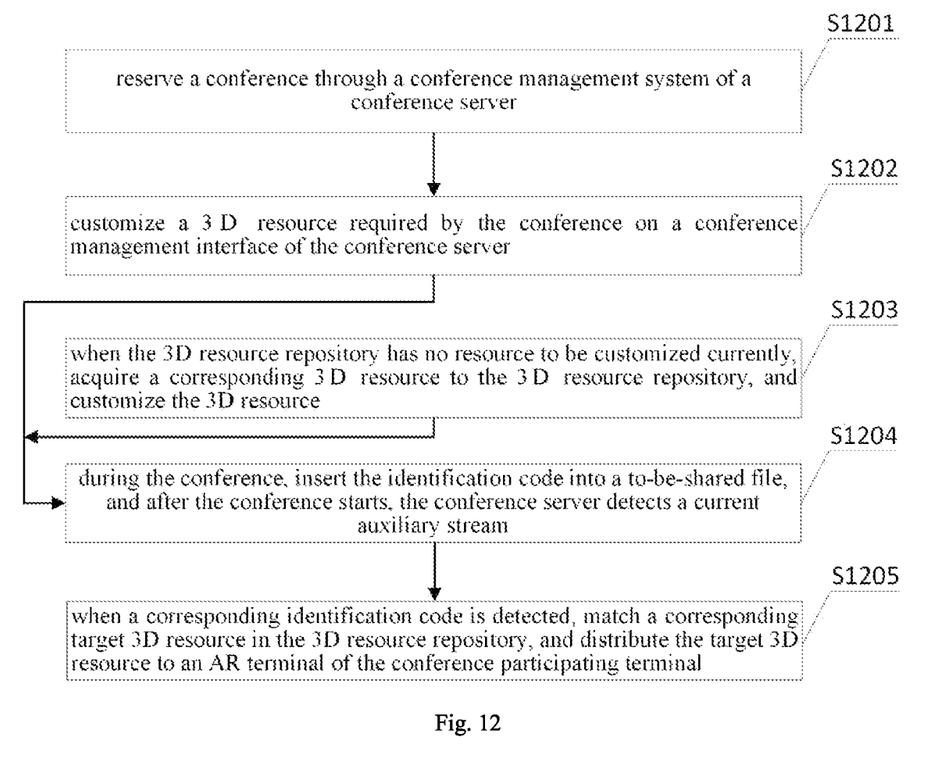
FIG. 12 is a schematic flowchart of conference control according to Embodiment two of the present disclosure.

Based on the above device, this embodiment provides an complete conference control process, including conference reservation, matching between identification codes (i.e., three-dimensional resource identification information) and three-dimensional model resources, identification of the identification codes by the conference server during the conference, and display of the three-dimensional model resources. When the conference server identifies that content of the current conference stream (such as an auxiliary stream) includes an identification code, the conference server may acquire a three-dimensional model resource matching the identification code, and distribute the three-dimensional model resource to an AR terminal (such as AR glasses) of each participant for display. Referring to FIG. 12, the following steps are included.

At step S1201, a conference is reserved through a conference management system of a conference server.

At step S1202, a three-dimensional resource required by the conference is customized on a conference management interface of the conference server using a default or user-defined identification code. Then S1204 is performed.

At step S1203, when the three-dimensional resource repository has no resource to be customized, a corresponding three-dimensional resource is acquired from an IP address and a path of the terminal, stored in the three-dimensional resource repository, and then customized. Then S1204 is performed.

At step S1204, during the conference, the identification code is inserted into a to-be-shared file. After the conference starts, the conference server detects a current auxiliary stream (such as shared video files, document files, and audio files).

At step S1205, when a corresponding identification code is detected, a corresponding target three-dimensional resource matched the three-dimensional resource repository is distributed to an AR terminal of the conference participating terminal.

Embodiment Three

Figure 13:
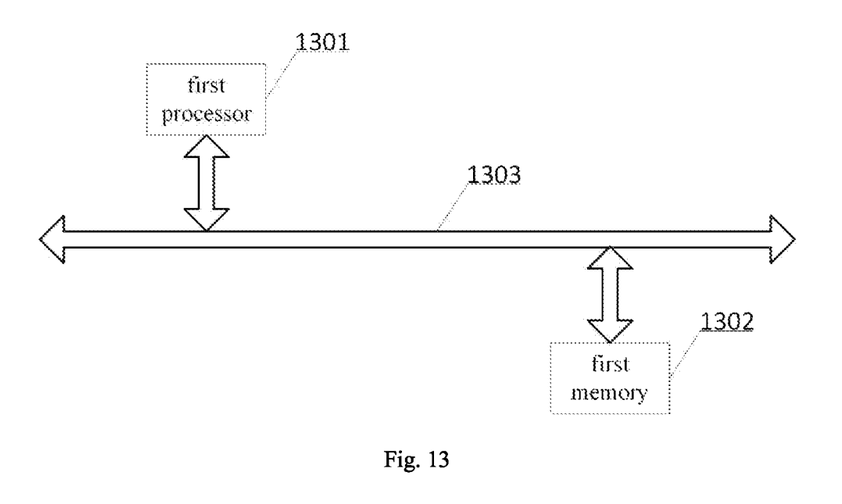
FIG. 13 is a schematic structural diagram of a conference server according to Embodiment three of the present disclosure.

This embodiment further provides a conference server, which, referring to FIG. 13, includes a first processor 1301, a first memory 1302 and a first communication bus 1303.

The first communication bus 1303 is configured to realize a communication connection between the first processor 1301 and the first memory 1302.

In an example, the first processor 1301 is configured to execute a first computer program stored in the first memory 1302, to perform steps of the conference control method in each of the above embodiments.

Figure 14:
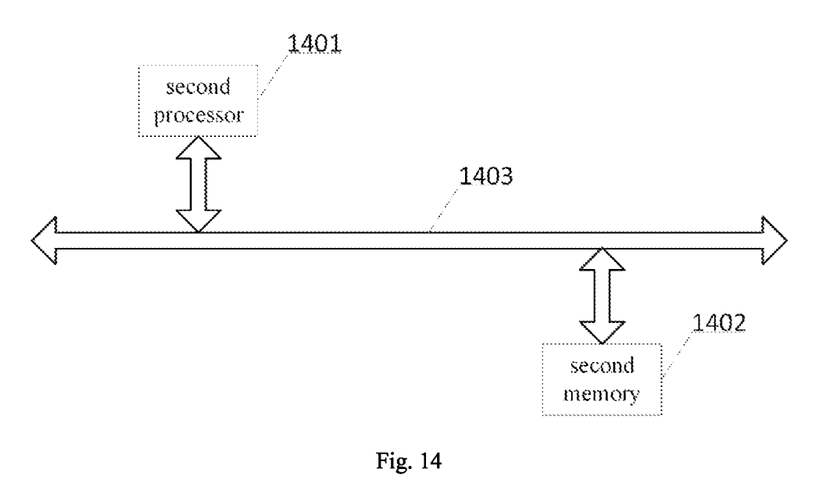
FIG. 14 is a schematic structural diagram of a conference participating terminal according to Embodiment three of the present disclosure.

This embodiment further provides a conference participating terminal, which, referring to FIG. 14, includes a second processor 1401, a second memory 1402 and a second communication bus 1403.

The second communication bus 1403 is configured to realize a communication connection between the second processor 1401 and the second memory 1402.

In an example, the second processor 1401 is configured to execute a second computer program stored in the second memory 1402, to perform steps of the conference participating method in each of the above embodiments.

This embodiment further provides a computer-readable storage medium. The computer-readable storage medium includes volatile and nonvolatile, removable and non-removable media implemented in any method or technology for storing information (such as computer-readable instructions, data structures, computer program modules or other data). The computer-readable storage medium includes, but is not limited to, a random access memory (RAM), a read-only memory (ROM), an electrically erasable programmable read-only memory (EEPROM), a flash memory or other memory technologies, a compact disc-read only memory (CD-ROM), a digital versatile disc (DVD) or other optical disc storage, a magnetic cassette, a magnetic tape, a magnetic disk storage or other magnetic storage devices, or any other medium used for storing desired information and accessible to a computer.

In an example, the computer-readable storage medium in this embodiment may be configured to store a first computer program which, when executed by one or more first processors, cause the one or more first processors to perform steps of the conference control method in each of the above embodiments.

In an example, the computer-readable storage medium in this embodiment may be configured to store a second computer program which, when executed by one or more second processors, cause the one or more second processors to perform steps of the method for participating conference in each of the above embodiments.

This embodiment further provides a first computer program (or referred to as computer software). The first computer program may be distributed on a computer-readable medium and executed by a computable device, to cause the computable device to perform at least one step of the conference control method in each of the above embodiments. Moreover, in some cases, the at least one step illustrated or described may be performed in a sequence other than that described in the above embodiments.

This embodiment further provides a second computer program (or referred to as computer software). The second computer program may be distributed on a computer-readable medium and executed by a computable device, to cause the computable device to perform at least one step of the method for participating conference in each of the above embodiments. Moreover, in some cases, the at least one step illustrated or described may be performed in a sequence other than that described in the above embodiments.

This embodiment further provides a first computer program product, including a computer-readable device storing the computer program as described above. The computer-readable device in this embodiment may include the computer-readable storage medium as described above.

In the method and device for controlling and participating conference, the server, the terminal, and the storage medium according to the embodiments of the present disclosure, on a server side, conference bitstream of a current conference may be acquired; when three-dimensional resource identification information is extracted from the conference bitstream, a three-dimensional resource matching is performed in a three-dimensional resource repository based on the three-dimensional resource identification information, and a matched target three-dimensional resource is transmitted to a three-dimensional resource processing terminal of a conference participating terminal; and the three-dimensional resource processing terminal of the conference participating terminal, upon receiving the target three-dimensional resource, presents the received target three-dimensional resource, which realizes dynamic matching, calling and display of the three-dimensional resource during the conference. Compared with the scheme that only two-dimensional pictures can be displayed in some cases, the conference display effect is enriched, the user experience satisfaction can be improved to a large extent, and scenarios applicable to the conference are further expanded. Advantages such as wide application scenarios, great practical value and large market space are provided.

Apparently, those having ordinary skill in the art should understand that all or some of the steps of the method, functional modules/units in the system and the device disclosed above may be implemented as software (which may be implemented using program code executable by a computing device), firmware, hardware and appropriate combinations thereof. In the hardware implementation, the division of the functional modules/units mentioned in the above description may not correspond to the division of physical components. For example, one physical component may have multiple functions, or one function or step may be executed jointly by several physical components. Some or all physical components may be implemented as software executed by processors such as central processing unit, digital signal processors or microcontrollers, implemented as hardware, or implemented as integrated circuits such as application specific integrated circuits.

In addition, as is well known to those having ordinary skill in the art, the communication medium generally includes computer-readable instructions, data structures, program modules or other data in modulated data signals such as carriers or other transmission mechanisms, and may include any information delivery medium. Therefore, the present disclosure is not limited to any specific combination of hardware and software.

The above are further detailed descriptions of the present disclosure in conjunction with specific embodiments, and it should be noted that the specific embodiments of the present disclosure are not limited to such descriptions. For those having ordinary skill in the art, several simple deductions or replacements may further be made without departing from the concept of the present disclosure, all of which should be considered within the protection scope of the present disclosure.

What is claimed is:

1. A conference control method, comprising:
   acquiring a conference bitstream of a current conference;
   performing, in response to extracting three-dimensional resource identification information from the conference bitstream, a three-dimensional resource matching in a preset three-dimensional resource repository based on the three-dimensional resource identification information;
   receiving a three-dimensional resource upload request;
   storing, according to a preset classification structure, a resource requested for upload by the three-dimensional resource upload request in the preset three-dimensional resource repository; and
   transmitting, in response to matching a target three-dimensional resource corresponding to the three-dimensional resource identification information in the preset three-dimensional resource repository, the target three-dimensional resource to a three-dimensional resource processing terminal of a conference participating terminal.

2. The conference control method of claim 1, further comprising:
   transmitting the conference bitstream to a video terminal of the conference participating terminal, wherein the conference bitstream comprises main video bitstream, auxiliary video bitstream and audio bitstream.

3. The conference control method of claim 1, prior to the step of acquiring conference bitstream of a current conference, further comprising:
   receiving a three-dimensional resource customization request;
   selecting, from the three-dimensional resource repository, a target three-dimensional resource required by the three-dimensional resource customization request; and
   setting three-dimensional resource identification information for the selected target three-dimensional resource, or in response to the target three-dimensional resource being currently configured with three-dimensional resource identification information, extracting the three-dimensional resource identification information; wherein the three-dimensional resource identification information is carried in the conference bitstream during the conference.

4. The conference control method of claim 1, wherein the three-dimensional resource identification information comprises at least one of text information, acoustic code information and picture information.

5. The conference control method of claim 4, wherein the conference bitstream comprises main video bitstream, auxiliary video bitstream and audio bitstream;
   in response to the three-dimensional resource identification information comprising at least one of the text information and the picture information, the step of extracting the three-dimensional resource identification information from the conference bitstream comprises: extracting the three-dimensional resource identification information from at least one of the main video bitstream, the auxiliary video bitstream and the audio bitstream; and
   in response to the three-dimensional resource identification information comprising the acoustic code information, the step of extracting the three-dimensional resource identification information from the conference bitstream comprises: extracting the three-dimensional resource identification information from the audio bitstream.

6. The conference control method of claim 1, wherein the step of transmitting the target three-dimensional resource to a three-dimensional resource processing terminal of a conference participating terminal comprises:
   in response to a three-dimensional resource processing management terminal existing in a site of the conference, transmitting the target three-dimensional resource to the three-dimensional resource processing management terminal, and delivering the target three-dimensional resource to a three-dimensional resource processing terminal of each conference participating terminal in the site by means of the three-dimensional resource processing management terminal.

7. The conference control method of claim 1, after the step of transmitting the target three-dimensional resource to a three-dimensional resource processing terminal of a conference participating terminal, further comprising:
in response to receiving a three-dimensional resource synchronization request transmitted by the conference participating terminal of the conference, transmitting a three-dimensional resource requested for synchronization by the three-dimensional resource synchronization request to a three-dimensional resource processing terminal of at least one conference participating terminal of the conference.

8. The conference control method of claim 7, prior to the step of in response to receiving a three-dimensional resource synchronization request transmitted by the conference participating terminal of the conference, transmitting a three-dimensional resource requested for synchronization by the three-dimensional resource synchronization request to a three-dimensional resource processing terminal of at least one conference participating terminal of the conference, further comprising:
in response to a determination that the conference participating terminal transmitting the three-dimensional resource synchronization request currently has a set permission, transmitting the three-dimensional resource requested for synchronization by the three-dimensional resource synchronization request to the three-dimensional resource processing terminal of the at least one conference participating terminal of the conference.

9. A conference server, comprising:
a processor,
a memory, and
a computer program stored in the memory and executable by the processor;
wherein the computer program, when executed by the processor, causes the processor to perform the steps of the conference control method of claim 1.

10. A non-transitory computer-readable storage medium, storing a computer program which, when executed by a processor, causes the processor to perform steps of the conference control method of claim 1.

11. A method for participating a conference, comprising:
receiving a target three-dimensional resource transmitted by a conference server, wherein the target three-dimensional resource is a three-dimensional resource matched by the conference server in a preset three-dimensional resource repository based on three-dimensional resource identification information extracted from a current conference bitstream;
presenting the target three-dimensional resource; and
sending a three-dimensional resource upload request comprising resource classification and labels of three-dimensional resources which are requested to be uploaded.

12. The method for participating a conference of claim 11, further comprising:
receiving a three-dimensional resource editing instruction; and
editing the three-dimensional resource according to the three-dimensional resource editing instruction.

13. The method for participating a conference of claim 12, after the step of editing the three-dimensional resource according to the three-dimensional resource editing instruction, further comprising:
receiving a three-dimensional resource synchronization instruction; and
transmitting, to the conference server according to the three-dimensional resource synchronization instruction, a three-dimensional resource synchronization request for synchronizing the edited three-dimensional resource to at least one other conference participating terminal.

14. The method for participating a conference of claim 11, wherein the step of presenting the target three-dimensional resource comprises:
displaying the three-dimensional resource at an indicated position in an indicated unified coordinate system.

15. A conference participating terminal, comprising:
a processor,
a memory, and
a computer program stored in the memory and executable by the processor;
wherein the computer program, when executed by the processor, causes the processor to perform steps of the method for participating conference of claim 11.

16. A non-transitory computer-readable storage medium, storing a computer program which, when executed by a processor, causes the processor to perform steps of the method for participating a conference of claim 11.

17. The method for participating a conference of claim 11, wherein the step of presenting the target three-dimensional resource comprises:
displaying the three-dimensional resource at a corresponding position in its own coordinate system.

* * * * *